(12) United States Patent
Yudanov et al.

(10) Patent No.: US 10,509,596 B2
(45) Date of Patent: Dec. 17, 2019

(54) EXTREME-BANDWIDTH SCALABLE PERFORMANCE-PER-WATT GPU ARCHITECTURE

(71) Applicant: Advanced Micro Devices, Inc., Santa Clara, CA (US)

(72) Inventors: Dmitri Yudanov, Austin, TX (US); Jiasheng Chen, Orlando, FL (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 57 days.

(21) Appl. No.: 15/851,476

(22) Filed: Dec. 21, 2017

(65) Prior Publication Data

US 2019/0196742 A1    Jun. 27, 2019

(51) Int. Cl.
*G06F 3/00* (2006.01)
*G06F 3/06* (2006.01)
*G06T 1/60* (2006.01)
*G06T 1/20* (2006.01)
*G06F 9/38* (2018.01)

(52) U.S. Cl.
CPC .......... *G06F 3/0659* (2013.01); *G06F 3/0604* (2013.01); *G06F 3/0679* (2013.01); *G06T 1/60* (2013.01); *G06F 9/3887* (2013.01); *G06T 1/20* (2013.01)

(58) Field of Classification Search
None
See application file for complete search history.

(56) References Cited

U.S. PATENT DOCUMENTS

2017/0061304 A1* 3/2017 Van Lunteren ....... G06F 9/4498

OTHER PUBLICATIONS

Giridhar, B. et al., "Exploring DRAM Organizations for Energy-Efficient and Resilient Exascale Memories", Proceedings of the International Conferences on High Performance Computing, Networking, Storage and Analysis, Nov. 17-21, 2013, 12 pgs., Article No. 23, ACM, Denver, CO, USA.
Advanced Micro Devices, Inc., "White Paper | AMD Graphics Cores Next (GCN) Architecture", 18 pgs., 2012 (Retrieved at: https://www.amd.com/Documents/GCN_Architecture_whitepaper.pdf).
Puttaswamy, K. et al., "3D-Integrated SRAM Components for High-Performance Microprocessors", IEEE Transactions on Computers, Oct. 2009, pp. 1369-1381, vol. 58, No. 10., IEEE Computer Society, USA.

(Continued)

*Primary Examiner* — Midys Rojas
(74) *Attorney, Agent, or Firm* — Volpe and Koenig, P.C.

(57) ABSTRACT

A technique for accessing memory in an accelerated processing device coupled to stacked memory dies is provided herein. The technique includes receiving a memory access request from an execution unit and identifying whether the memory access request corresponds to memory cells of the stacked dies that are considered local to the execution unit or non-local. For local accesses, the access is made "directly", that is, without using a bus. A control die coordinates operations for such local accesses, activating particular through-silicon-vias associated with the memory cells that include the data for the access. Non-local accesses are made via a distributed cache fabric and an interconnect bus in the control die. Various other features and details are provided below.

17 Claims, 9 Drawing Sheets

(56) References Cited

OTHER PUBLICATIONS

Kersey, C. et al., "Harmonica: An FPGA-based Data Parallel Soft Core", Proceedings of 2014 IEEE 22nd Annual International Symposium on Field-Programmable Custom Computing Machines (FCCM), May 11-13, 2014, p. 171, IEEE, Boston, MA, USA.

Kim, Y. et al, "A Case for Exploiting Subarray-Level Parallelism (SALP) in DRAM", Proceedings of 2012 39th Annual International Symposium on Computer Architecture, Jun. 9-13, 2012, 12 pgs, IEEE, Portland, OR, USA.

Tezzaron Semiconductor, "Tezzaron 3D Memory Technology 101", 8 pgs., available at: https://tezzaron.com/purvision/our-technology-101/, 2017 (Retrieved Dec. 21, 2017).

Ivensas, "Memory Stacking", 7 pgs., available at: https://www.invensas.com/solutions/memory-stacking/, 2016 (Retrieved Dec. 21, 2017).

* cited by examiner

Memory Die 404

Subarray Strip 406

Subarray 408

Subarray 408

•••

Subarray 408

Subarray Strip 406

Subarray 408

Subarray 408

•••

Subarray 408

⋮

Subarray Strip 406

Subarray 408

Subarray 408

•••

Subarray 408

EXTREME-BANDWIDTH SCALABLE PERFORMANCE-PER-WATT GPU ARCHITECTURE

GOVERNMENT RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Three-dimensional ("3D") graphics processing units perform a series of steps to convert input geometry into a two-dimensional ("2D") image for display on a screen. Such graphics processing units may also be used for general purpose computing. Because of the high amount of data processed by such units, improvements in memory design and interface for such units is desirable.

BRIEF DESCRIPTION OF THE DRAWINGS

A more detailed understanding can be had from the following description, given by way of example in conjunction with the accompanying drawings wherein.

DETAILED DESCRIPTION

A technique for accessing memory in an accelerated processing device coupled to stacked memory dies is provided herein. The technique includes receiving a memory access request from an execution unit and identifying whether the memory access request corresponds to memory cells of the stacked dies that are considered local to the execution unit or non-local. For local accesses, the access is made "directly", that is, without using a bus. A control die coordinates operations for such local accesses, activating particular through-silicon-vias associated with the memory cells that include the data for the access. Non-local accesses are made via a distributed cache fabric and an interconnect bus in the control die. Various other features and details are provided below.

Figure 1:
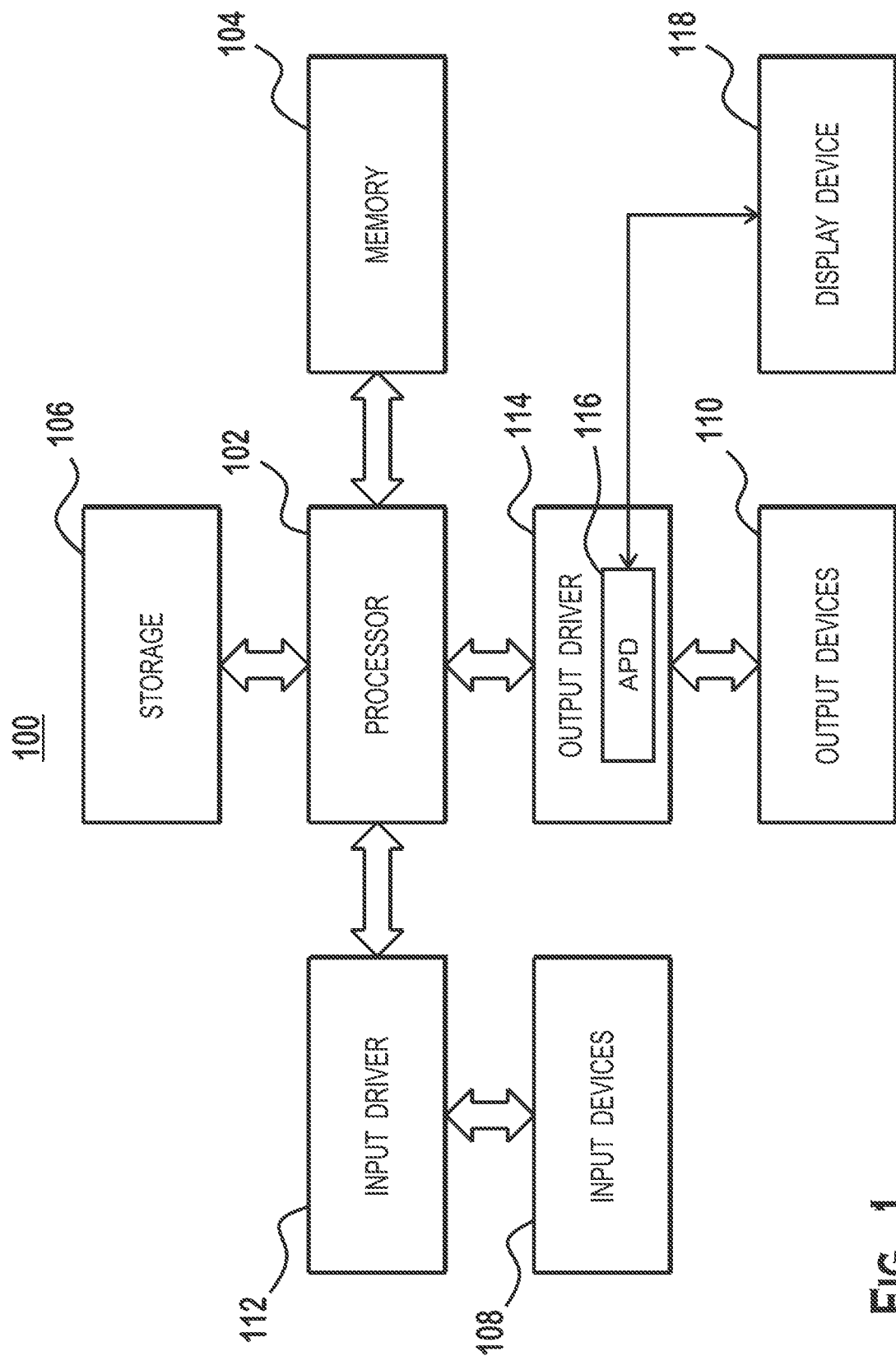
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102 or the same die stack as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
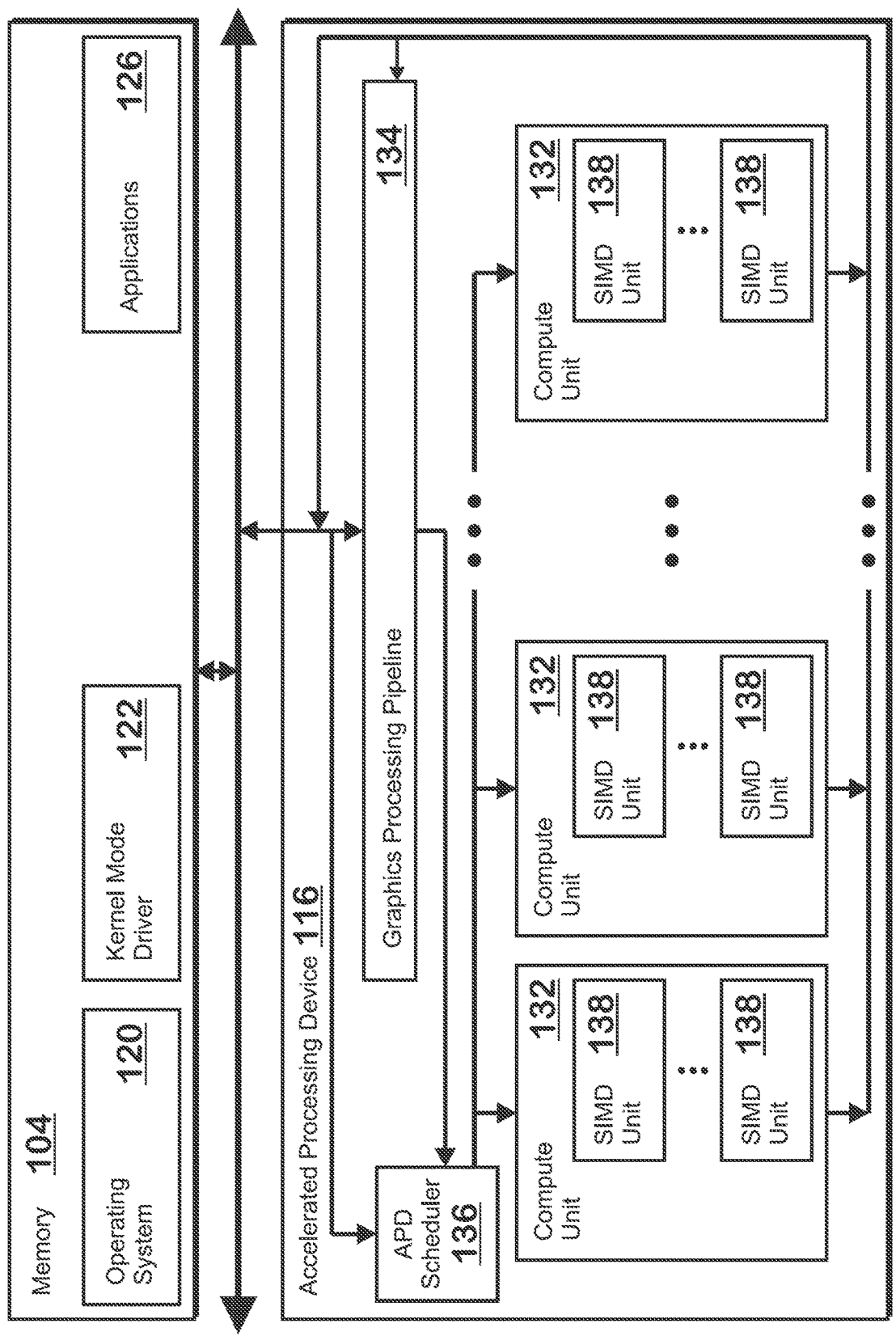
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In some examples, a SIMD unit 138 maintains a predication mask that includes enable bits for each lane of the SIMD unit 138. Lanes that are indicated as being enabled in the predication mask are lanes for which the given instruction is executed. Lanes that are indicated as being not enabled in the predication mask are lanes for which the given instruction is not executed.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
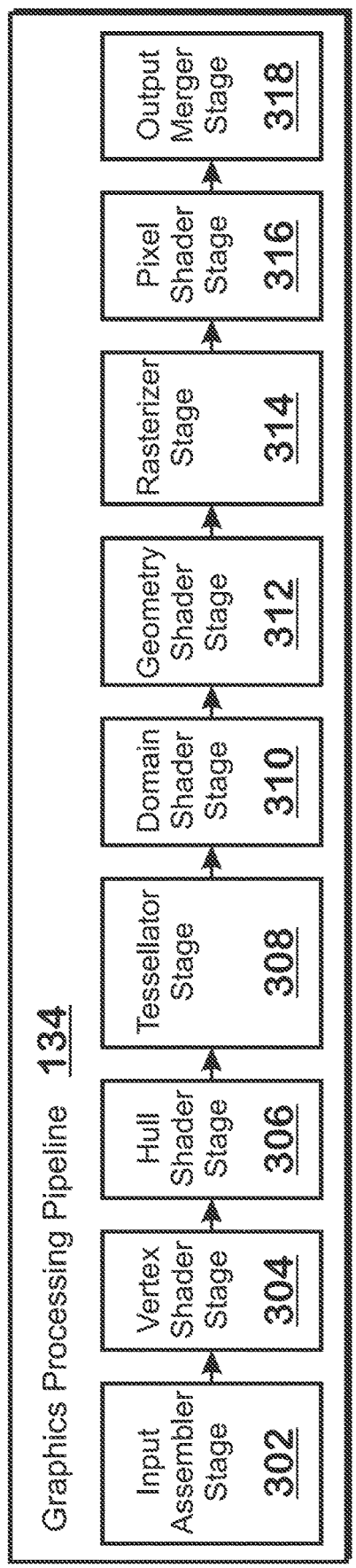
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

In some implementations, a large portion of the die on which the APD 116 is implemented is consumed by memory such as caches and hardware implementing the communication fabric between such memory elements. A three-dimensional architecture, in which much of the memory is incorporated into stacked memory dies is provided herein. In this three-dimensional architecture the execution units (e.g., SIMD units 138) are included in a base die (referred to simply as the APD 116) and stacked memory dies service memory requests for the execution units. Control and coordination are performed by a control die interposed between the APD 116 and memory dies.

Figure 4A:
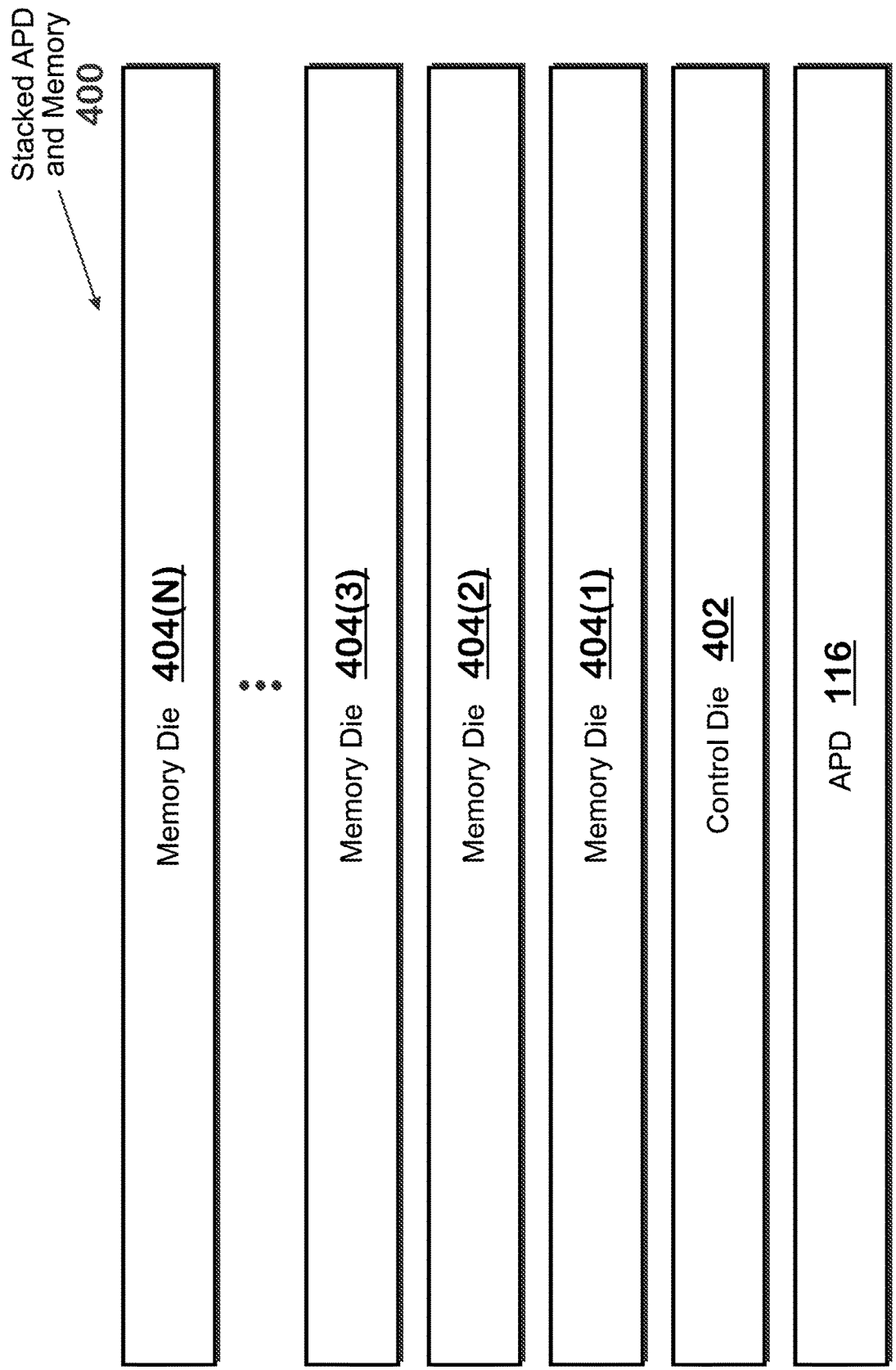
FIGS. 4A-4E illustrate various details of a stacked accelerated processing device and memory architecture.

FIG. 4A is a block diagram of a stacked APD and memory 400, according to an example. As shown, the stacked APD and memory 400 includes the APD 116 of FIGS. 1 and 2, a control die 402, which is coupled to the APD 116, and a plurality of memory dies 404. The APD 116 includes execution units such as the SIMD units 138 of FIG. 2, as well as other supporting units. The memory dies 404 include elements for storing data for access by the execution units of the APD 116. The control die 402 serves as an interface between the APD 116 and the memory dies 404 and also includes a distributed cache system.

The memory dies 404, APD 116, and control die 402 communicate with through-silicon-vias ("TSVs"), which are electrical conduits that extend vertically through the different dies. Individual TSVs are coupled to multiple different individual components in different memory dies 404. Typically, an individual TSV is coupled to a copy of a particular component in the different memory dies 404, terminating at the control die 402 which controls operations of such TSVs and processes memory requests based on communication with the APD 116.

Each SIMD unit 138 is assigned a particular number of memory cells of the memory dies 404 as being "local" to the SIMD unit 138. The control die 402 provides direct transfer of data between SIMD units 138 and their respective local memory cells. "Direct" transfer of data refers to communication without the use of a bus, although other elements such as a sense amplifier, multiplexers, and other logic may exist in the path between the memory cells and the source or destination of data associated with a particular memory access in the APD 116. A distributed cache system and a bus system within the control die 402 provide a communication path between SIMD units 138 and non-local memory cells. This local/non-local architecture allows for low latency, "direct" memory accesses for a fixed amount of local memory while also allowing for increased memory size via access to non-local memory. Note that although FIG. 4E illustrates a system in which the unit of execution that is considered "local" to a set of local memory cells is the SIMD unit 138. In other words, in the example of FIG. 4E, each SIMD unit 138 is associated with a particular number of local memory cells). In alternatives, other execution units are considered to be local to a set of local memory cells. For example, a group of SIMD units 138, a compute unit 132, or a number of compute units 132 may be considered a local execution unit, with each collection of local memory cells being associated with such local execution unit.

Figure 4B:
Figure 4B:
Figure 4B:
Figure 4B:
Figure 4B:
Figure 4B:
Figure 4B:
Figure 4B:
Figure 4B:

FIG. 4B is a schematic diagram of a memory die 404, according to an example. As shown, the memory die 404 includes one or more subarray strips 406, each of which includes one or more subarrays 408. Each subarray 408 is a two-dimensional grid of memory cells (not shown), where each memory cell stores a particular amount of data (such as one bit). The subarrays 408 are grouped into subarray strips 406, with each subarray 408 in a subarray strip 406.

When a request for memory access is received from the APD 116, the control die 402 identifies the particular memory die(s) 404, subarray strips 406, and subarrays 408 that include the particular memory cells associated with the memory access. The control die 402 transmits signals on the TSVs to operate the identified memory cells. Access to different memory cells is parallelized to some degree in that multiple memory cells can be accessed in the same clock cycle. If contention on a particular line exists for a particular memory access (e.g., two memory cells that share a particular TSV are to be accessed for a single memory access), then the control die 402 resolves this contention by accessing the memory cells at different times. Additional details are provided below.

Figure 4C:
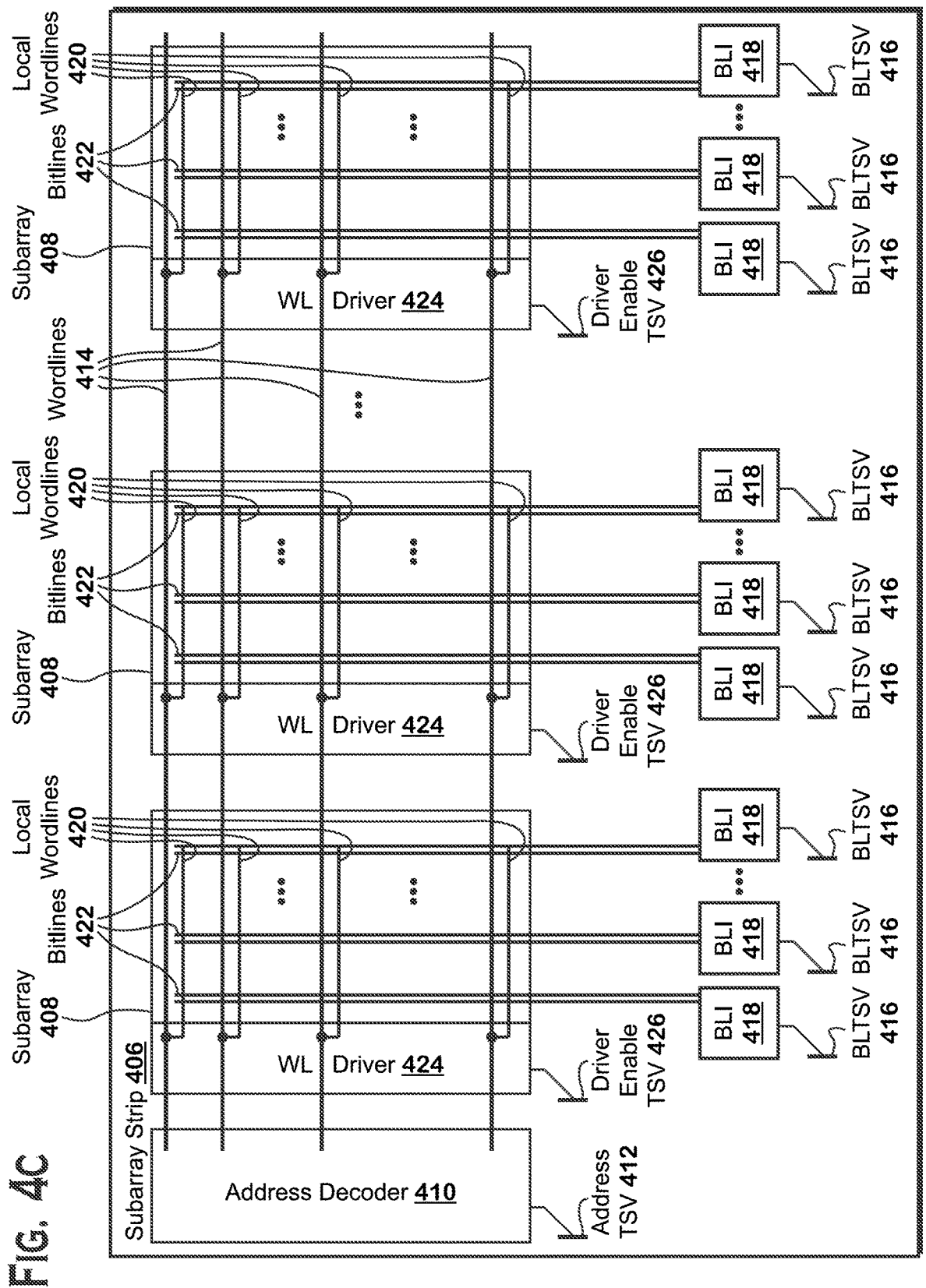

FIG. 4C is a schematic diagram of a subarray strip 406 illustrating additional detail as compared with FIG. 4B, according to an example. The subarray strip 406 includes an address decoder 410, one or more subarrays 408, one or more bit line interfaces 418, one or more bit line TSVs 418, and one or more driver enable TSVs 426. In addition, a plurality of wordlines 414, a plurality of local wordlines 420, and a plurality of bitlines 422 are present for accessing memory cells of the subarrays 408.

To perform a memory access (e.g., read or write), which includes an address, the control die 402 identifies a subarray strip 406 associated with the address. The control die 402 generates a local address and transmits that local address to the address decoder 410 via the address TSV 412. The local address identifies a particular wordline 414 based on the address of the memory request.

The address decoder 410 is configured to drive one or more wordlines 414 based on the local address. The wordlines 414 trigger local wordlines 420 in individual subarrays 408 via a wordline driver ("WL driver") 424. The control die 402 enables particular subarrays 408 that store data for the address associated with the memory access via the driver enable TSVs 426. More specifically, since wordlines 420 from the address decoder 410 are shared among the subarrays 408 of a subarray strip 406, and not all subarrays 408 of a subarray strip 406 may store data for a particular memory access, the control die 402 disables subarrays 408 for a particular memory access that do not store data for that memory access.

The control die 402 also accesses one or more bit line interfaces ("BLI") 418 based on the address associated with the memory access. The bit line interfaces 418 couple the bitline through silicon vias ("BLTSVs") 416 to the bitlines 422. In one example, the BLIs 418 couple multiple bitlines 422 to single BLTSVs 416, using a multiplexor with time-based selection, to time-multiplex values for the different bitlines 422 onto the same BLTSV 416. In other words, the BLIs 418 time-multiplex the different bitlines 422 onto individual BLTSVs 416. For example, in a first cycle, a BLI 418 may select data from one bitline 422 for transmission to a BLTSV 416. In the next cycle, the BLI 418 may select data from a different bitline 422 for transmission, and so on. In some implementations, the number of bitlines 422 that are time-multiplexed is controllable and can be modified at any time. For example, during a first period, a BLI 418 multiplexes between two different bitlines 422. In this example, during a second period, the BLI 418 multiplexes between four different bitlines 422. Of course, when more bitlines 422 are time-multiplexed, the rate of access for local memory cells is reduced. The number of bitlines selected for multiplexing may be determined based on any technically feasible set of factors.

One additional task performed by the control die 402 is preventing access to particular memory cells for work-items that are switched off due to predication. More specifically, as described above with respect to FIG. 2, the SIMD units 138 execute programs in a SIMD manner, meaning that individual instructions are executed for multiple pieces of data simultaneously. Each individual piece of data is associated with a different work-item. Thus, each work-item can be thought of as a different instance of an identical shader program running for different pieces of data. In SIMD execution, it is possible for particular work-items to be switched off ("disabled" or "not enabled"), for a variety of reasons. Being switched off means that the SIMD unit 138 produces no result for the work-item that is switched off for a particular instruction. For memory accesses, a switched-off work item stores no value to memory or loads no value to a register file. Thus, to save power, when a particular memory access instruction is made for a particular SIMD unit 138, the control die 402 does not perform the memory access for switched-off work items. More specifically, the control die 402 does not activate the BLTSV 416, the driver enable TSV 426 or the address TSV 412 for the data for that particular work-item.

As stated above, the bit line interface 418 includes a multiplexor that selects a different individual bitline 422 in different cycles when data from different bitlines 422 coupled to a single BLTSV 416 is required. The way in which access to different bitlines 422 coupled to a single bit-line interface 418 occurs depends on the number of bitlines 422 being accessed within a contention window (where a "contention window" is a period of time during which multiple bitlines are contended). The shorter the contention window, the more time-based multiplexing occurs. For example, if four bitlines 422 are coupled to a bitline interface 418 and data from those four bitlines 422 are needed in four cycles, then time multiplexing occurs in a four-to-one manner (a different bitline 422 is selected in each of four cycles). If only two bitlines 422 are needed in four cycles, then time multiplexing occurs in a two-to-one manner (a different bitline 422 is selected in each of two cycles). In addition to reducing power usage, in some situations, preventing accesses for switched-off work-items reduces the contention window and thus increases the rate of memory access. For example, for a particular SIMD memory access, if a switched-off work-item would need data from a bitline 422 that shares a bitline interface 418 with two other work-items that are not switched off, then preventing the memory access for the switched-off work-item allows time multiplexing to occur in a two-to-one manner.

Although a subarray strip 406 from only one memory die 404 is illustrated in FIG. 4C, in various examples, any or all of the TSVs (address TSVs 412, BLTSVs 416, and driver enable TSVs 426) are coupled to multiple memory dies 404 in a vertical stack as illustrated in FIG. 4A. In some examples, any or all TSVs are coupled to each memory die 404 in a vertical stack. Any of the memory dies 404 coupled to a particular TSV that is shared among multiple dies may use that TSV to communicate with the control die 402 and/or the APD 116. Individual TSVs cannot be used at the same time by multiple memory dies 404. In situations where such contention would occur, the memory dies 404 time-share the contended TSVs.

In various situations, individual memory accesses access data associated with different memory dies 404 for a single memory access, where "single memory access" means a memory access triggered by a single instruction executed in a SIMD manner and thus for multiple SIMD lanes. In some situations, these accesses to different dies occur simultaneously—that is, within the same clock cycle. Due to the above, it is possible in various situations for a single memory access to result in accesses to different memory dies simultaneously (e.g., in the same clock cycle).

Figure 4D:
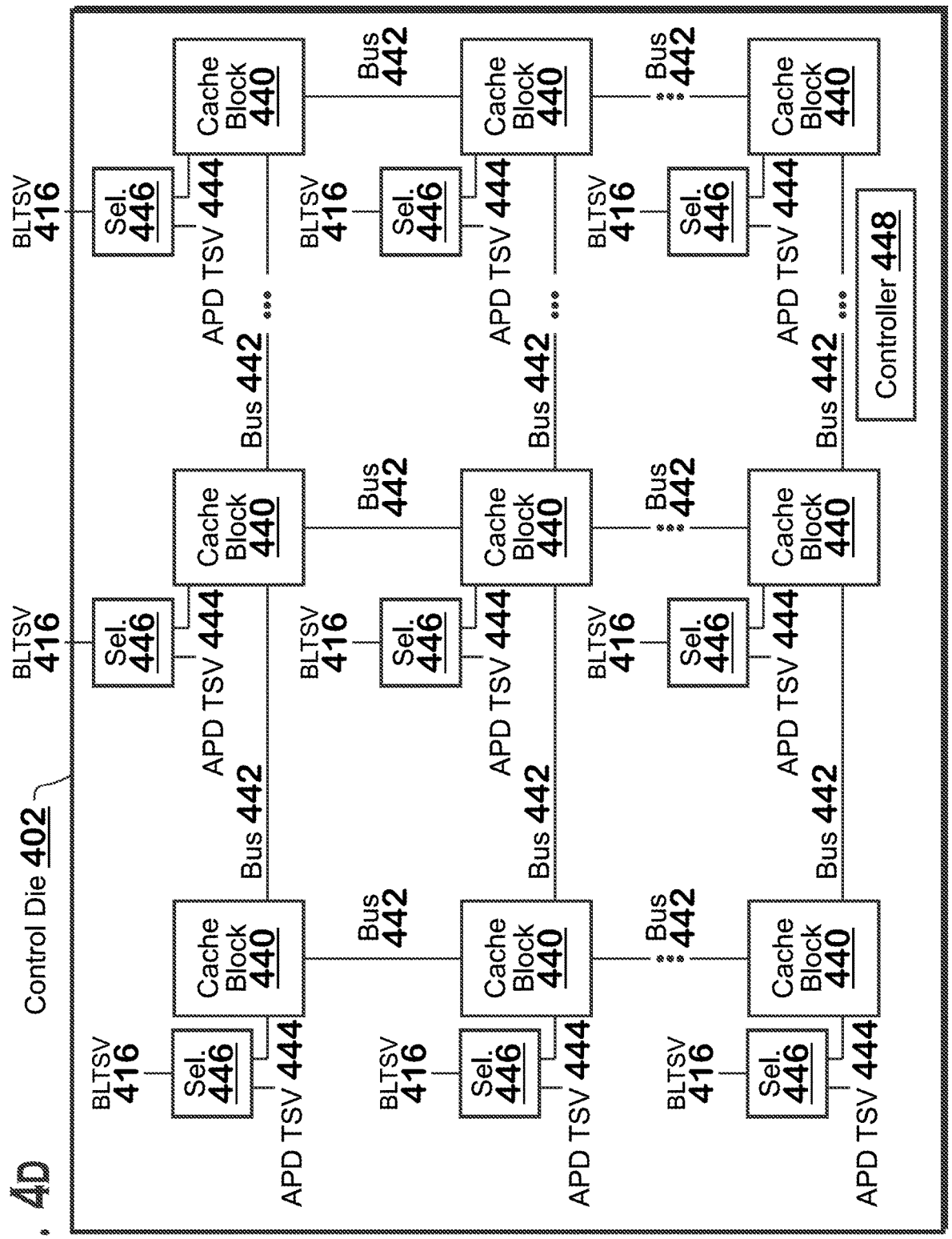
Figure 4E:
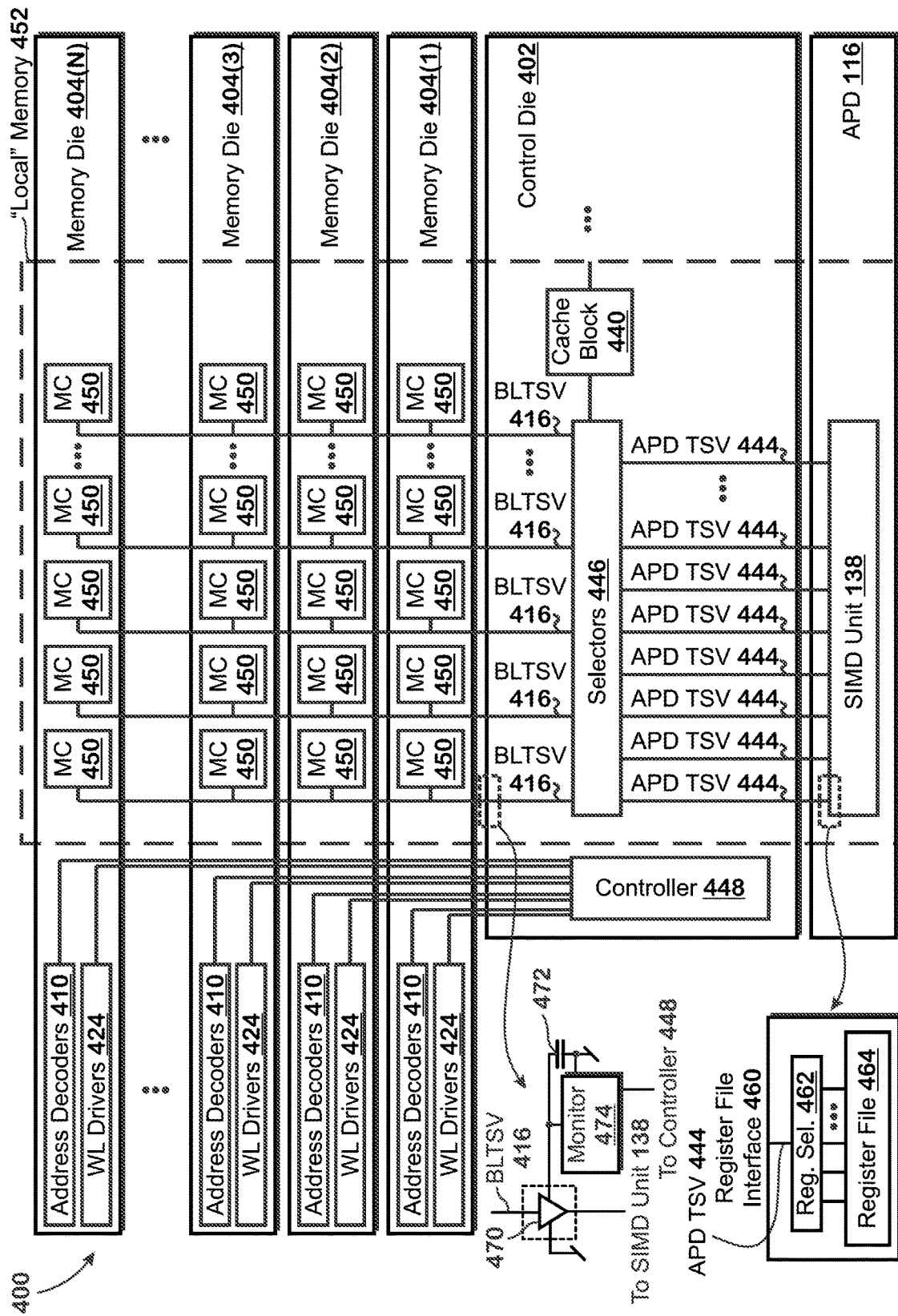

FIG. 4D illustrates aspects of the control die 402 according to an example. The control die 402 includes a distributed cache that includes cache blocks 440 and a bus 442. Each cache block 440 is assigned as a local cache for a particular set of execution units of the APD 116 and also for a particular set of BLTSVs 416 (and thus for the particular set of the memory cells of the memory dies 404 that are coupled to the BLTSVs 416). In various examples, each cache block 440 is assigned as a local cache for a particular SIMD unit 138, set of SIMD units 138, or compute unit 132. The fact that a cache block 440 is local to a set of execution units and to a set of BLTSVs 416 also means that different sets of execution units are local to different BLTSVs 416.

That particular cache blocks 440, sets of BLTSVs 416 and execution units are local to each other means that memory accesses made by a particular execution unit that involves local BLTSVs 416 do not involve transfer of data from those local BLTSVs 416 over the bus 442. More specifically, any particular memory access (e.g., a read access or a write access) made by a particular execution unit specifies one or more addresses from which to read or to which to write. If those addresses correspond to data that is accessed via BLTSVs 416 local to that execution unit, then that data is provided to the execution units directly (i.e., without the bus 442). A cache block 440 local to an execution unit may also store data. If data for a particular memory access made by a particular execution unit is stored in a cache block 440 local to that execution unit, the cache block 440 returns that data to the execution unit without an access to a memory die 404. Data accesses from a particular execution unit that can be made either via BLTSVs 416 local to that execution unit or via the local cache block 440 are referred to as "local memory accesses" herein and data accesses from a particular execution unit that are serviced via the bus 442 are referred to as "non-local memory accesses" herein.

For a memory access specifying addresses corresponding to BLTSVs 416 that are not local to the execution unit making the memory access, the cache system and bus 442 are involved. More specifically, the cache block 440 local to the execution unit places a request to access the non-local data on the bus 442. The cache block 440 (or cache blocks 440) local to the BLTSVs 416 at which the requested data is stored either makes the access within that cache block 440 if stored in that cache block 440 or makes an access to that data via the BLTSVs 416 local to that cache block 440 (or cache blocks 440) if not stored in that cache block 440.

The selectors 446 are configured to select between the cache block 440 or an APD TSV 444 for individual data accesses. For local data accesses that are serviced directly through BLTSVs 416 (and thus without involvement of the bus 442), the selector 446 is configured to couple the APDSVs 444 to the BLTSVs 416. For non-local data accesses or data accesses serviced by a local cache block 440, the selector 446 is configured to couple the APDTSVs 444 to the local cache block 440.

Some individual memory accesses request access to data stored both in memory accessed via local BLTSVs 416 and the bus 442. For such accesses, the selector 446 is configured to cause accesses the local BLTSVs 416 and to store the data for such access into the local cache block 440. The selector 446 is also configured to obtain the full data for the request from the cache.

A controller 448 orchestrates operations of the control die 402 and of the memory dies 404. In some examples, the controller 448 also maintains the coherency of the cache block 440 and performs address translation based on page tables as well. The controller 448 may be embodied in any technically feasible manner, such as in a microcontroller as executable code, in hard-coded logic, or in any other technically feasible manner. This orchestration includes operating the selectors 446 as described herein (i.e., coupling individual BLTSVs 416 to either a cache block 440 or an APD TSV 444). This orchestration also includes receiving requests from the APD 116 for access (e.g., read or write) to memory at a given address, identifying memory dies 404, subarray strips 406, and subarrays 408 that that correspond to the address for which access is requested. This orchestration also includes determining local addresses for particular address decoders 410 to use to select particular wordlines 404 and forwarding such local addresses to the appropriate address decoder 410 via address TSVs 412, determining which driver enable TSVs 426 are to be activated, and operating bitlines 422 via bitline interfaces 418 to access individual memory cells. The controller 448 may be implemented in any technically feasible manner. In one example, the controller 448 is implemented as a set of distributed controllers, each coupled with a local cache block 440 and orchestrated by a global scheduler such as scheduler APD scheduler 136. In some examples, this distributed implementation reduces latency associated with delivering control signals as compared to an implementation in which a single centralized controller 448 is used instead. In various examples, the bus 442 is implemented as a network topology as shown in FIG. 4D, or in any other type of topology, such as a global ring bus with stops at cache blocks 440.

FIG. 4E is a schematic view illustrating aspects of the stacked APD and memory 400, according to an example. A "local" memory 452 is illustrated, which includes memory cells 450 that are considered to be local to a particular execution unit, illustrated in FIG. 4E as a SIMD unit 138. The illustrated cache block 440 is also local to the SIMD unit 138, as are the BLTSVs 416.

An individual execution unit accesses local memory 452 via a local set of BLTSVs 416, as illustrated. When accessing memory locally in such a manner, the selectors 446 are configured to couple the APD TSVs 444 coupled to the SIMD unit 138 to the BLTSVs 416 local to that SIMD unit 138. When accessing memory non-locally, the selectors 446 are configured to couple the APD TSVs 444 coupled to the SIMD unit 138 to the cache block 440 for servicing the memory request in a non-local manner (i.e., via the bus 442).

Each of the memory cells 450 represents an individual component configured to store a unit of data such as one bit. In some examples, each memory cell 450 includes a bit cell (such as a capacitor) having the capability of storing one bit, coupled to an access transistor. The gate of such a transistor is coupled to a corresponding local wordline 420. The transistor is coupled to the bit cell and to a corresponding bitline 422. Reads and writes are performed to the bit cell in any technically feasible manner.

A memory access made by the SIMD unit 138 involves multiple bits of data. In one instance, each of multiple work-items executing on the SIMD unit 138 request access to particular data. The SIMD unit 138 processes these requests together, requesting memory access for multiple work-items in a single memory access transaction made to the control die 402. If at least some of the data is stored in local memory 452, then the control die 402 identifies the set of memory cells 450 that stores the data, determines local addresses for the address decoders 410 corresponding to the identified memory cells 450, and identifies the corresponding driver enable TSVs 426 for the identified memory cells 450. The control die 402 supplies the addresses to the address decoders 410 via the appropriate address TSVs 412, enables the appropriate subarrays 408, and activates the BLTSVs 416 to access the data.

Multiple memory cells 450 for a single memory access may be accessed at the same time. For example, the control die 402 may access one memory cell 450 from one memory die 404 with one BLTSV 416 while also accessing a different memory cell 450 from a different memory die 404 with a different BLTSV 416. However, memory cells 450 on different memory dies 404 but on the same BLTSV 416 cannot be accessed simultaneously. The control die 402 may perform accesses to individual memory cells 450 in turns, accessing different sets of memory cells 450 in different cycles for a single memory access request received from a SIMD unit 138.

The APD TSVs 444 interface with the SIMD unit 138 at a register file interface 460. A register selector 462 selects one or more storage elements (e.g., a bit cell) within a register file 464 of the SIMD unit 138 as a source (for a write) or destination (for a read) for data transmitted via a particular APD TSV 444. Multiple register file interfaces 460 exist to route multiple items of data to different registers and/or different bitcells within the same register.

The controller 448 is configured to monitor actual and/or estimated power consumption (referred to herein as "power consumption") and reduce the rate at which memory accesses are made to the memory dies 404 based on the power consumption. In an example implementation, each of the BLTSVs 416 terminates on a different sense amplifier 470 (only one is shown in FIG. 4E) for amplifying bitline signals carrying data from the memory cells 450. These sense amplifiers 470 are powered by a power supply (not shown). A decoupling capacitor 472 is placed between the high and low voltage lines of the power supply to act as a current reservoir should power consumption exceed instantaneous power generation of the power supply. A monitor 474 monitors the voltage between the high and low voltage lines (i.e., across the decoupling capacitor 472). If the voltage drops below a threshold, then it is determined that too much power is being used. In this instance, the controller 448 reduces the rate at which memory accesses are made to the memory cells 450. If the voltage monitored by the monitor 474 rises above the threshold or another threshold, then the controller 448 returns to the previous rate or increases to a different rate of accesses to the memory cells 450. Alternatively, a drop in voltage across the decoupling capacitor 472 can be used to generate a power usage estimate and the rate of accesses can be adjusted based on that estimate. Other techniques for estimating power usage other than through the use of a voltage monitor placed across a decoupling capacitor can be used alternatively or additionally. In one alternative or additional example, the monitor 448 monitors power consumption of an execution unit through activity counters (which may increment whenever instructions are executed or whenever instructions or operations of a certain type, such as, for example, memory reads or writes, are executed). The monitor 448 adjusts the power distribution to avoid thermal damage, for example, by reducing the instruction rate when a high power draw is detected. If the activity counters indicate an instruction execution rate that is above a threshold, then the controller 448 reduces the rate of execution. Power usage estimates can be made at a granular level, such as for each subarray 408, subarray strip 406, or for each row of memory cells 450 in a subarray 408. In some examples, the controller 448 or another element dynamically estimates energy consumption for each subrow in an accessed subarray and encodes an indication of that energy consumption as a small data value (e.g., as a 2- to 4-bit number, amounting to a 1% overhead). Any number of techniques can be used to estimate energy consumption, such as by measuring temperature, measuring voltage ripple on a decoupling capacitor, sensing current draw, or any other feasible technique. In some implementations, by default, the stored energy consumption is set to the maximum value. After the first access to a subrow, this maximum value is overwritten with an estimated value.

The SIMD units 138 include arithmetic logic units ("ALUs") for performing operations for certain instructions. Some or all of these ALUs can be configured in such a way as to be switched between ALUs and memory cells that store data. When configured as memory cells that store data, the memory cells service other ALUs in the same SIMD units 138. An ALU may be converted into memory by adding ports to registers internal to the ALU. Such a modification may decrease performance of the convertible ALU, so SIMD units 138 may include a certain number of non-convertible ALUs (e.g., 20%) and a certain number of convertible ALUs (e.g., 80%). In some examples, SIMD units 138 include the local register file 464. In some examples, a portion of the local register file 464 is switchable to being configured as a last level cache in order to reduce power, latency, and bandwidth of access to local or remote memory. Other cache levels may exist in a cache hierarchy besides a last level cache configured into the local register file 464.

Figure 5:
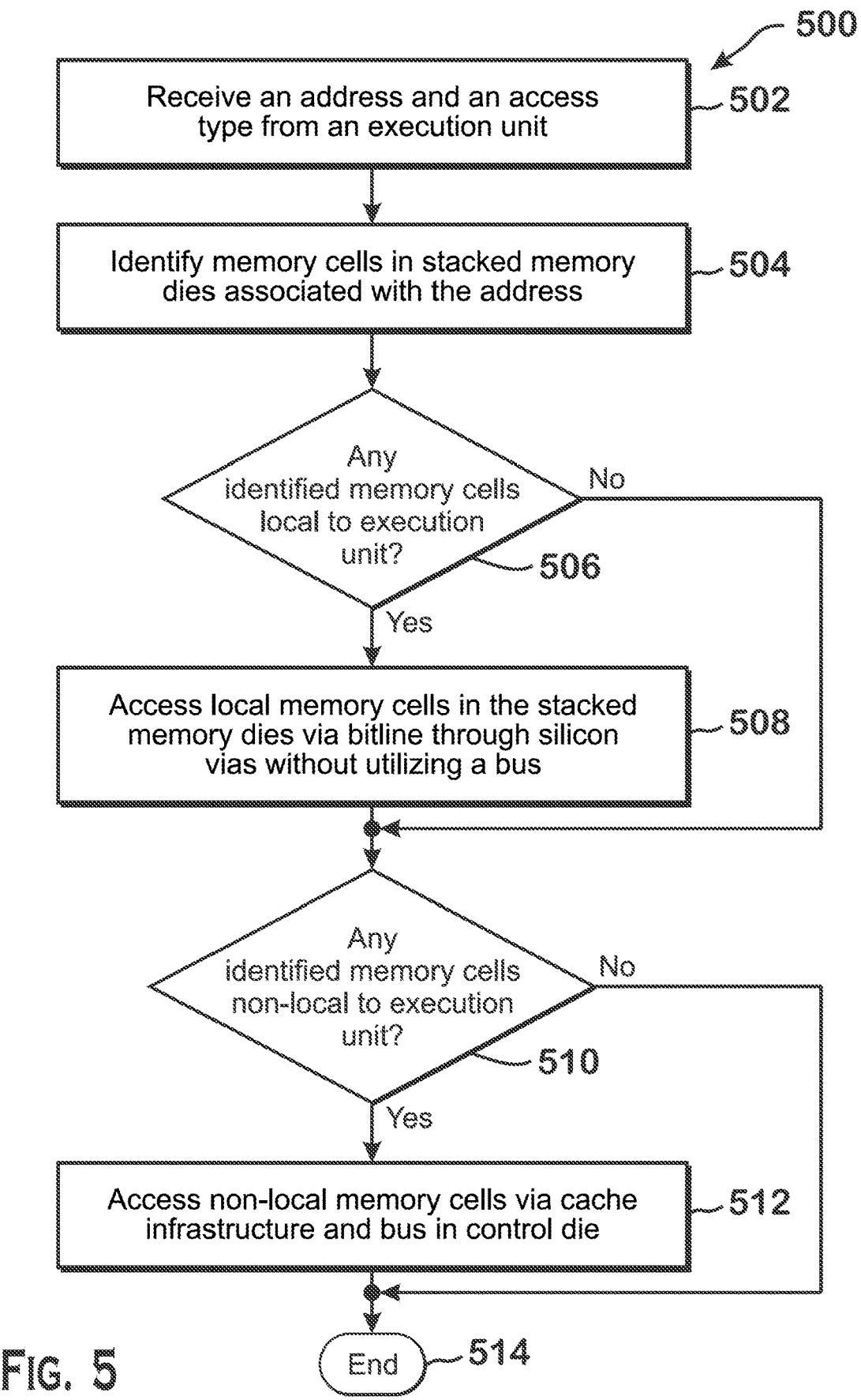
FIG. 5 is a flow diagram illustrating a technique for accessing data in stacked memory dies, according to an example.

FIG. 5 is a flow diagram illustrating a technique for accessing data in stacked memory dies, according to an example. Although described with respect to the system of FIGS. 1-3 and 4A-4E, those of skill in the art will understand that any system configured to perform the method with any technically feasible order of steps falls within the scope of the present disclosure.

The method 500 begins at step 502, where the control die 402 receives a memory access request including an address from an execution unit. At step 504, the control die 402 identifies the memory cells in stacked memory dies 404 that store the data for which access is requested. At step 506, the control die 402 determines whether the identified memory cells include memory cells that are local to the execution unit (e.g., a SIMD unit 138). If there are memory cells that are local to the execution unit, then the method proceeds to step 508. At step 508, the control die 402 triggers access to the memory cells in the stacked memory dies 404 via BLTSVs 416 local to the execution unit, after which the method 500 proceeds to step 510. Triggering access includes identifying particular memory dies 404 that include the local memory cells 450, identifying BLTSVs 416 coupled to the local memory cells 450, identifying the subarray strips 406 and subarrays 408 that include the local memory cells 450, and activating each such identified item to access the identified local memory cells 450. If contention would occurs on a particular TSV (such as a BLTSV 416) or with other hardware (such as BLIs 418) if access to two or more memory cells 450 were to occur simultaneously, then the control die 402 staggers the operations in time so that different memory cells 450 are accessed in different clock cycles in such a manner that contention does not occur.

If, at step 506, the memory cells identified at step 504 include no memory cells local to the execution unit, then the method proceeds to step 510. As described above, different execution units are considered to be local to different memory cells 450.

At step 510, the control die 402 determines whether any of the memory cells identified at step 504 are non-local to the execution unit. If one or more identified memory cells are non-local to the execution unit, then the method 500 proceeds to step 512, where the control die 402 causes the non-local memory cells to be accessed via a cache infrastructure and bus 442 in the control die 402. If one or more identified memory cells include no non-local memory cells, then the method 500 proceeds to step 514 where the method 500 ends.

In some implementations, if accesses to both local and non-local memory cells 450 were to occur for a particular memory access request, then the control die 402 delays the accesses for the local memory cells 450 such that latency for both local and non-local memory cells 450 have the same latency. This delay may be achieved in any technically feasible manner. In one example, the controller 448 designates a particular combination of BLTSV 416 and selector 446 as being non-local when the selector 446 is accessing data via the attached cache block 440. (Note, in FIG. 4D, it is shown that one selector 446 is coupled to one BLTSV 416, and thus a BLTSV 416 can be said to be obtaining data non-locally, even though that data traverses the selector 446 but not necessarily the associated BLTSV 416). In this scenario, the BLTSV 416 is "reserved" until that data is accessed via the cache block 440, and thus such BLTSVs 416 are "freed" less quickly than BLTSVs used for local accesses. During the time in which the "non-local" BLTSVs 416 are reserved, the local BLTSVs 416 may be used to obtain data from the local memory for multiple other memory requests. In an example, a local BLTSV 416 is used to service ten (or any number) of local memory requests while a non-local BLTSV 416 is waiting for its data to be returned via its cache block 440. The controller 448 causes latency for data retrieved for any particular memory request that uses both non-local and local BLTSVs 416 to be matched. In other words, the data obtained with local BLTSVs 416 may be held in a buffer until data obtained with non-local BLTSVs 416 are returned.

In an example, the controller 448 reserves a certain number of BLTSVs 416 for local accesses, with the remainder reserved for non-local accesses. While the non-local accesses are occurring, the BLTSVs 416 reserved for local accesses are multiplexed to different memory cells within a single subarray. More specifically, as described elsewhere herein, BLTSVs 416 are coupled to many memory cells of a subarray via a multiplexor. This multiplexor can be very wide to allow a single BLTSV 416 to be coupled to a large number of memory cells of a single subarray. When a memory access requests local and non-local data, the local BLTSVs 416 may be multiplexed to many memory cells and may access many of those memory cells. With such a technique, latency is matched between non-local and local memory accesses by virtue of a different in access rate—i.e., for each SIMD memory access, multiple local memory accesses are made for each non-local memory access.

Any or all steps in FIG. 5 described as being performed by the control die 402 may be considered to be performed by the controller 448 within the control die 402. It should be understood that for performance reasons, steps 506 and 510 can occur in parallel and simultaneously as well as following steps 508 and 512. However, step 512 would be most likely to take more time that step 508 due to non-local access.

After the flow illustrated in FIG. 5 occurs, the flow may repeat for other memory accesses. In addition, the flow in FIG. 5 is performed for each SIMD unit that makes memory accesses. Thus, multiple instances of the flow execute in an APD 116 during operation of the APD 116. The power monitoring and access rate adjustment described above with respect to FIG. 4E may occur at any point before, after, or during the method 500.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for accessing data of a stacked accelerated processing device ("APD") and memory, the method comprising:
   receiving an address and an access type for a memory access request from an execution unit;
   identifying memory cells in stacked memory dies associated with the address;
   determining that the identified memory cells include at least one memory cell assigned to the execution unit as a local memory cell;
   responsive to the determining, accessing the local memory cells via bitline through silicon vias ("BLTSVs") without using a bus; and
   responsive to determining that the identified memory cells include at least one memory cell assigned to the execution unit as a non-local memory cell, accessing the at least one non-local memory cell via a distributed cache and a shared bus.

2. The method of claim 1, further comprising:
   storing data from at least one memory cell of the identified memory cells, the at least one memory cell being local to the execution unit, in the cache and retrieving the stored data from the cache with data from the at least one non-local memory cell.

3. The method of claim 2, further comprising:
   matching latency observed by the execution unit for the data retrieved from the memory cell that is local to the execution unit with latency observed by the execution unit for the data retrieved from the non-local memory cell.

4. The method of claim 3, wherein matching the latency includes:
   accessing multiple memory cells local to the execution unit while a single memory access to the non-local memory cell is being made.

5. The method of claim 1, wherein:
   the memory access request comprises a request to access memory for single-instruction-multiple-data ("SIMD") execution with a predication mask specifying at least one SIMD lane that is not enabled for the SIMD execution, of a plurality of SIMD lanes associated with the SIMD execution;
   the memory access request comprises a request to access different groups of memory cells, each group associated with a different SIMD lane of the SIMD lanes;
   identifying the memory cells associated with the address comprises:
      identifying memory cells associated with enabled SIMD lanes of the SIMD lanes, according to the predication mask, but not with disabled SIMD lanes of the SIMD lanes, according to the predication mask; and
   accessing the local memory cells via the BLTSVs comprises:
      accessing, via the bitline through silicon vias, the identified memory cells, including the memory cells associated with the enabled SIMD lanes, but not including the memory cells associated with the disabled SIMD lanes.

6. The method of claim 1, wherein:
at least two of the identified memory cells comprise memory cells of different dies of the stacked memory dies; and
accessing the local memory cells comprises accessing two memory cells of different stacked memory dies in the same clock cycle.

7. The method of claim 1, further comprising converting an arithmetic logic unit of the execution unit to a set of registers for use in servicing memory access requests from the execution unit.

8. The method of claim 1, further comprising estimating power consumption for memory accesses to the stacked memory dies and adjusting access rate based on the estimating power consumption, wherein estimating power consumption is performed based on one or both of: voltage across a decoupling capacitor coupled in parallel to a power supply for at least a portion of the stacked memory dies; or an activity counter measurement, and wherein an estimate of power consumption is stored on a per-subrow basis.

9. A control die for accessing data of a stacked accelerated processing device ("APD") memory, the control die comprising:
a plurality of selectors coupled to a plurality of APD through-silicon-vias ("TSVs") and to a plurality of bitline TSVs ("BLTSVs"); and
a controller configured to:
receive an address and an access type for a memory access request from an execution unit;
identify memory cells in stacked memory dies associated with the address;
determine that the identified memory cells include at least one memory cell assigned to the execution unit as a local memory cell;
responsive to the determining, access the local memory cells via the BLTSVs without using a bus; and
responsive to determining that the identified memory cells include at least one memory cell assigned to the execution unit as a non-local memory cell, access the at least one non-local memory cell via a distributed cache and a shared bus.

10. The control die of claim 9, wherein the controller is further configured to:
store data from at least one memory cell of the identified memory cells, the at least one memory cell being local to the execution unit, in the cache and retrieving the stored data from the cache with data from the at least one memory non-local cell.

11. The control die of claim 10, wherein the controller is further configured to:
match latency observed by the execution unit for the data retrieved from the memory cell that is local to the execution unit with latency observed by the execution unit for the data retrieved from the non-local memory cell.

12. The control die of claim 11, wherein matching the latency includes:
accessing multiple memory cells local to the execution unit while a single memory access to the non-local memory cell is being made.

13. The control die of claim 9, wherein:
the memory access request comprises a request to access memory for single-instruction-multiple-data ("SIMD") execution with a predication mask specifying at least one SIMD lane that is not enabled for the SIMD execution, of a plurality of SIMD lanes associated with the SIMD execution;
the memory access request comprises a request to access different groups of memory cells, each group associated with a different SIMD lane of the SIMD lanes;
the controller is configured to identify the memory cells associated with the address by:
identifying memory cells associated with enabled SIMD lanes of the SIMD lanes, according to the predication mask, but not with disabled SIMD lanes of the SIMD lanes, according to the predication mask; and
the controller is configured to access the local memory cells via the BLTSVs by:
accessing, via the bitline through silicon vias, the identified memory cells, including the memory cells associated with the enabled SIMD lanes, but not including the memory cells associated with the disabled SIMD lanes.

14. The control die of claim 9, wherein:
at least two of the identified memory cells comprise memory cells of different dies of the stacked memory dies; and
accessing the local memory cells comprises accessing two memory cells of different stacked memory dies in the same clock cycle.

15. The control die of claim 9, wherein the controller is further configured to:
convert an arithmetic logic unit of the execution unit to a set of registers for use in servicing memory access requests from the execution unit.

16. The control die of claim 9, wherein the controller is further configured to:
estimate power consumption for memory accesses to the stacked memory dies and adjusting access rate based on the estimating power consumption, wherein estimating power consumption is performed based on one or both of: voltage across a decoupling capacitor coupled in parallel to a power supply for at least a portion of the stacked memory dies; or an activity counter measurement, and wherein an estimate of power consumption is stored on a per-subrow basis.

17. A stacked accelerated processing device ("APD") and memory device comprising:
a plurality of stacked memory dies;
an APD; and
a control die for accessing data of the plurality of memory dies, the control die comprising:
a plurality of selectors coupled to a plurality of APD through-silicon-vias ("TSVs") and to a plurality of bitline TSVs ("BLTSVs"), the plurality of APD TSVs coupled to the plurality of stacked memory dies and the plurality of BLTSVs coupled to the APD; and
a controller configured to:
receive an address and an access type for a memory access request from an execution unit of the APD;
identify memory cells in the plurality of stacked memory dies associated with the address;
determine that the identified memory cells include at least one memory cell assigned to the execution unit as a local memory cell;
responsive to the determining, access the local memory cells via the BLTSVs without using a bus; and
responsive to determining that the identified memory cells include at least one memory cell assigned to the execution unit as a non-local memory cell, access the at least one non-local memory cell via a distributed cache and a shared bus.

* * * * *